United States Patent
Sakamoto

(10) Patent No.: US 6,450,782 B1
(45) Date of Patent: Sep. 17, 2002

(54) PUMP-MOTOR ASSEMBLY HAVING A MOTOR MOUNT

(75) Inventor: Stephen M. Sakamoto, Oklahoma City, OK (US)

(73) Assignee: Wood Group Esp, Inc., Oklahoma City, OK (US)

( * ) Notice: Subject to any disclaimer, the term of this patent is extended or adjusted under 35 U.S.C. 154(b) by 0 days.

(21) Appl. No.: 09/578,002

(22) Filed: May 24, 2000

(51) Int. Cl.[7] .......................... F04B 17/00; F04B 35/00; F16M 1/00
(52) U.S. Cl. .................. 417/359; 417/360; 248/678
(58) Field of Search .............................. 417/359, 360, 417/423.15; 248/670, 678, 346.07

(56) References Cited

U.S. PATENT DOCUMENTS

| | | | | |
|---|---|---|---|---|
| 1,211,352 A | * | 1/1917 | Rathburn | 248/657 |
| 1,707,304 A | * | 4/1929 | Halvorsen | 417/359 |
| RE18,303 E | * | 12/1931 | Harm | 417/359 |
| 3,066,898 A | * | 12/1962 | Haynes | 248/23 |
| 4,012,021 A | * | 3/1977 | Duceppe | 248/23 |
| 4,345,734 A | | 8/1982 | Studinger | |
| 4,354,655 A | | 10/1982 | Hengst | |
| 4,433,824 A | * | 2/1984 | Koosha | 248/662 |
| 4,511,112 A | | 4/1985 | Ruehle | |
| 5,110,082 A | * | 5/1992 | Rowan, Jr. | 248/678 |
| 5,488,259 A | | 1/1996 | Cho | |
| 5,975,480 A | | 11/1999 | Schaefer et al. | |

* cited by examiner

Primary Examiner—Charles G. Freay
Assistant Examiner—Timothy P. Solak
(74) Attorney, Agent, or Firm—Crowe & Dunlevy

(57) ABSTRACT

A pump-motor assembly having a base, a horizontal pump, a pump bracket to attach the pump to the base, a motor to energize the pump and a motor mount with a motor table and a motor platform to support and position the motor. The motor platform has a standard hole pattern for fasteners connecting the motor platform to the motor table. The motor table has a base and an adapter plate with multiple aperture sets standardizing the motor platform height and motor fastener pattern that establish the height of the motor shaft relative to the motor platform. The thickness of the base plate can be varied as necessary to determine a required motor shaft height, thereby accommodating motor sizes within a selected large range of motor sizes.

8 Claims, 5 Drawing Sheets

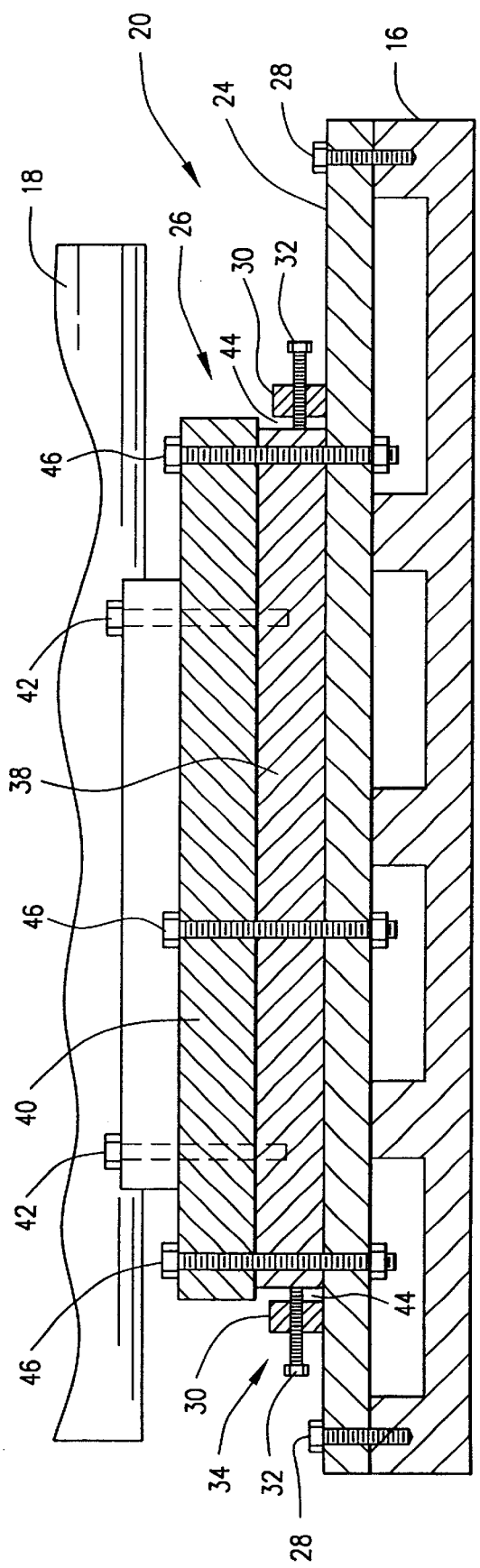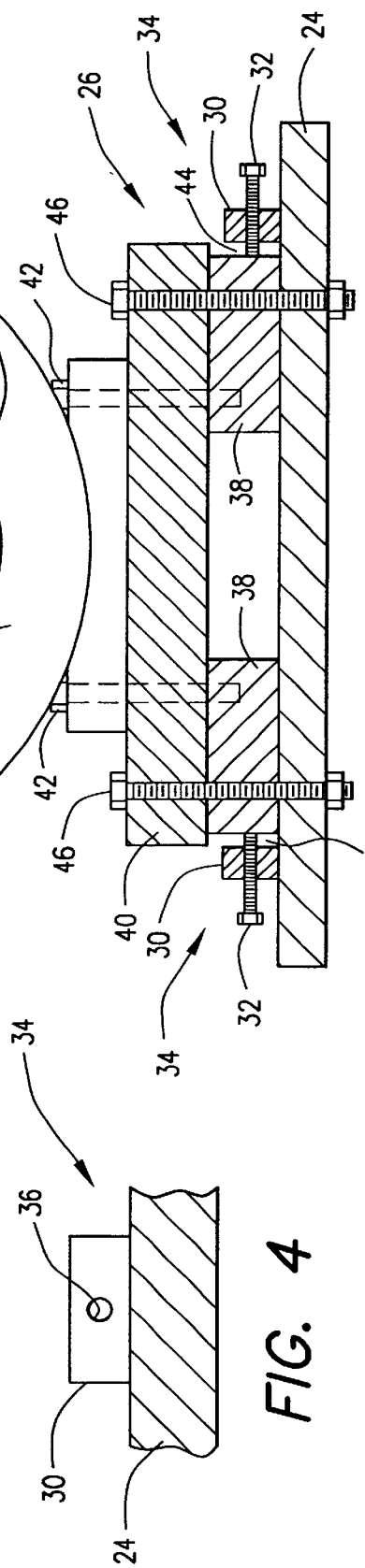
FIG. 3
FIG. 4
FIG. 5

PUMP-MOTOR ASSEMBLY HAVING A MOTOR MOUNT

FIELD OF THE INVENTION

The present invention relates generally to the field of pump-motor assemblies, and in particular but not by way of limitation, to motor mounts used in conjunction with horizontal pumps.

BACKGROUND OF INVENTION

Motors are widely used in industrial applications and a large cost of motor change-outs is in the cost and time involved with changing out or modifying the motor mount every time a motor size changes. This is especially true with existing horizontal pumping systems. These systems have flow rates and discharge pressure demands that can vary greatly over short periods of time requiring a change-out of the pump. This causes the horsepower requirements to vary necessitating a change out of the motor. A typical horizontal pump-motor change usually means a change in motor frame and thrust chamber, pump intake bracket. This occurs since a change in the motor frame changes the shaft height and the thrust chamber/pump intake bracket must change to match the new shaft height.

The most common of the pump-motor assembly changes involves a change in shaft height and motor base. In the past manufactures have handled these changes by replacing the existing pump frame with a new one with a different motor platform height and bolt pattern. Each motor would require a different frame and each frame would require different drawings and part numbers to accommodate the different motor sizes. For instance, horizontal pumps used for downhole injection normally require ten different motor frames for a range of standard motors and eight different frame lengths. These requirements result in the manufacturer producing and maintaining more then eighty possible part numbers and associated drawings. This is time consuming and expensive for a manufacturer and supplier to deal with, from the up-front engineering design work to the associated large inventories.

There is a need for a semi-universal integrated motor mount that offers an economy of manufacture while affording maximum serviceability at the site of installation.

SUMMARY OF INVENTION

The present invention provides a pump-motor assembly having a base, a horizontal pump, a pump bracket to attach the pump to the base, a motor to energize the pump and a motor mount with a motor table and a motor platform to support and position the motor, the motor platform having a standard hole pattern for fasteners connecting the motor platform to the motor table. The motor table has a base and an adapter plate with multiple aperture sets standardizing the motor platform height and motor fastener pattern that establish the height of the motor shaft relative to the motor platform. The thickness of the base plate can be varied as necessary to determine a required motor shaft height, thereby accommodating motor sizes within a selected large range of motor sizes.

An object of the present invention is to provide an improved, adaptable pump-motor assembly having an adjustable mount that provides installation flexibility, field serviceability and economy of manufacture.

Other objects, advantages and features of the present invention will become clear from the following detailed description and drawings when read in conjunction with the claims.

BRIEF DESCRIPTION OF DRAWINGS

FIG. 3 is a side cross-sectional view taken at 3—3 in FIG. 2.

FIG. 4 is a partial cutaway view of the adjustment mechanism of FIG. 3.

FIG. 5 is a front, cross-sectional view taken at 5—5 in FIG. 2.

DESCRIPTION

Figure 1:
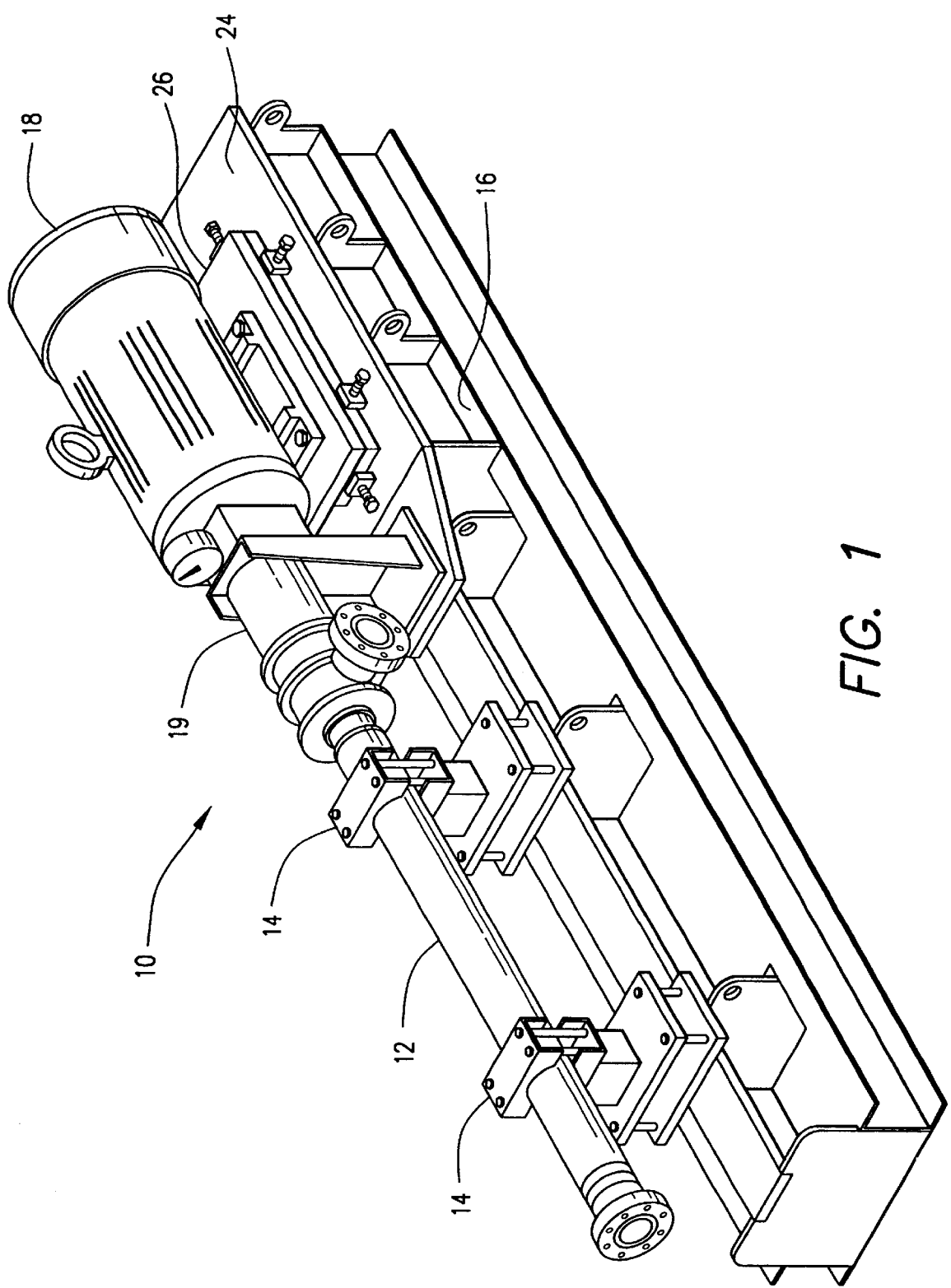
FIG. 1 a perspective view of a pump-motor assembly constructed in accordance with the present invention.
Figure 2:
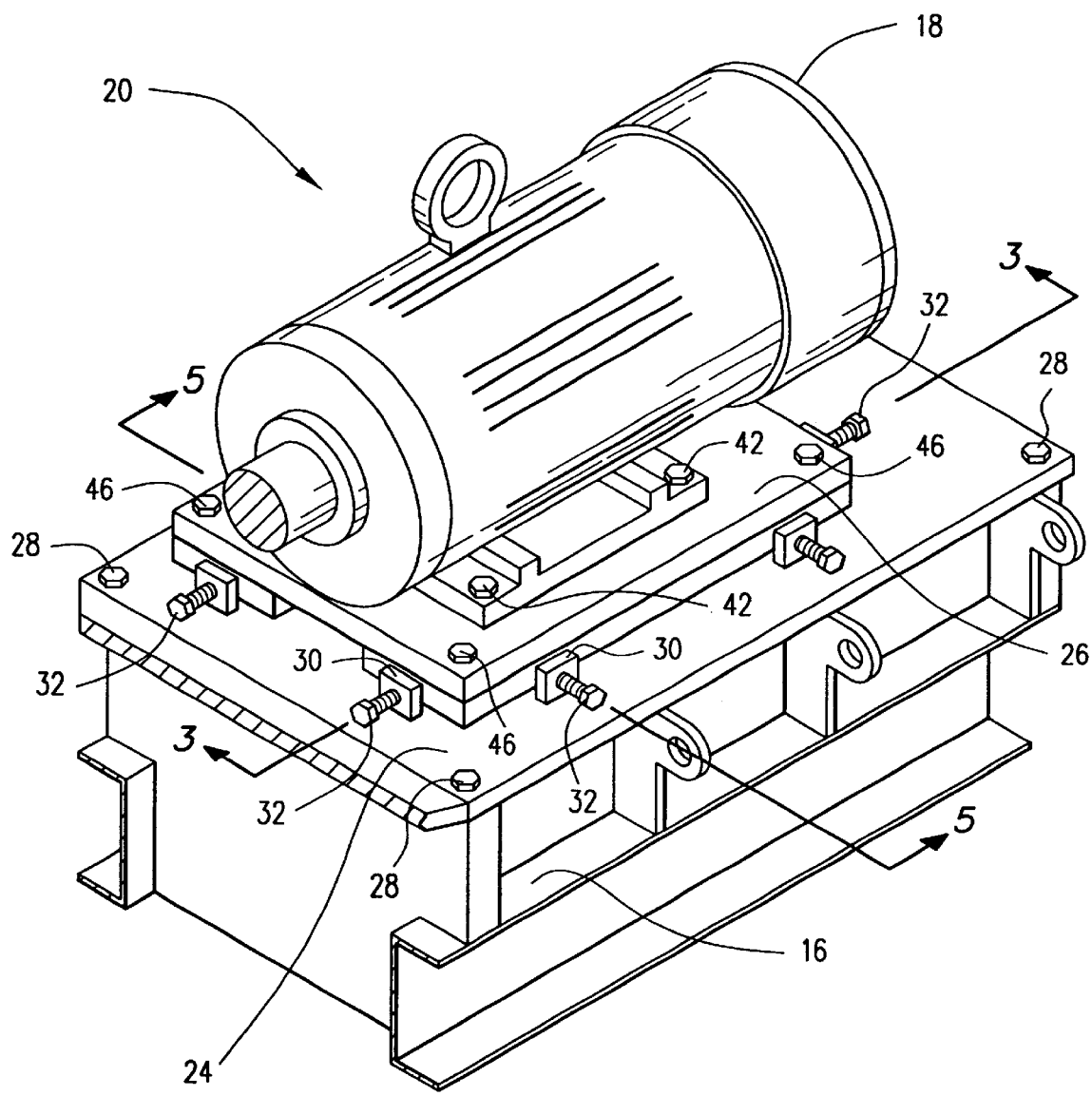
FIG. 2 is another perspective view of the motor assembly of FIG. 1 showing the motor platform and motor table.

Referring to the drawings in general and in particular to FIGS. 1 and 2, shown therein is a modular pump-motor assembly 10 constructed in accordance with the present invention. The pump-motor assembly 10 has a pump 12 and pump brackets 14 to attach the pump 12 to a base 16 which serves as a foundation for the pump-motor assembly 10. The elongated horizontal pump 12 is an electric submersible pump of the type commercially available in the industry.

The pump 12 is known to be sensitive to movement and requires a sturdy base. The base 16, also shown in FIG. 2, can be made of steel or any sturdy material, such as a metal or concrete composite, sufficient to support the weight of the pump-motor assembly 10 and maintain the stability thereof during operation without excessive movements due to external forces such as pump and motor vibrations.

A motor 18 is attached to the pump 12 through a thrust chamber intake assembly 19 as shown in FIG. 1. The pump 12 is shown in more detail as part of a motor mount 20 in FIG. 2, the motor mount 20 having a motor platform 24 and a motor table 26. The motor platform 24 and the motor table 26 cooperate to support the motor 18.

FIG. 3 shows the motor platform 24 as being attached to the base 16 with several base fasteners 28. An alternative to using base fasteners 28 is to permanently attach, as by welding, the motor platform 24 to the base 16. Attached to the motor platform 24 and forming portions of the motor mount 20 are a number of jacking blocks 30, two of which are disposed on opposing sides of the motor table 26. Each jacking block 30 together with a threaded jack screw 32 associated therewith serve as an adjustment mechanism 34.

FIG. 4 shows a side view of one of the adjustment mechanisms 34 (without the associated jack screw) attached to the motor platform 24. The jacking block 30 has a threaded jack screw bore 36 that receives the associated jack screw 32 extending there through to abut the motor table 26. The adjustment mechanisms 34 are spatially disposed to receive the motor table 26 therebetween, and the adjustment mechanisms 34 can be adjusted to secure the motor table 26 by turning the jack screws 32 to press against the motor table 26.

Referring to FIG. 5, the motor platform 24 and the motor table 26 of the motor mount 20 are shown. The motor table 26 has a pair of motor table bases 38 permanently attached, as by welding, or alternatively attached with fasteners to an adaptor plate 40. The adaptor plate 40 is disposed directly under the motor 18 which is attached to the motor platform 24 with motor fasteners 42.

FIG. 5 shows two of the adjustment mechanisms 34. These adjustment mechanisms 34 allow fine positional adjustment of the motor table 26 to be made in a direction normal to the direction of the adjustment mechanisms 34 shown in FIG. 3. Thus, adjustments can be made in both the x and y directions, and the magnitude of the adjustments can be determined by varying an adjustment space 44 between the jacking blocks 30 and the motor table 26 as shown in FIGS. 3 and 5, and by establishing the length of the jack screws 32 as required. As noted, the jack screws 32 actually engage the motor table base 38 which is secured to the adapter plate 40. Once necessary adjustments are made, the platform fasteners 46 shown in FIG. 5 can be tightened to maintain the desired position of the adapter plate 40.

Figure 6:
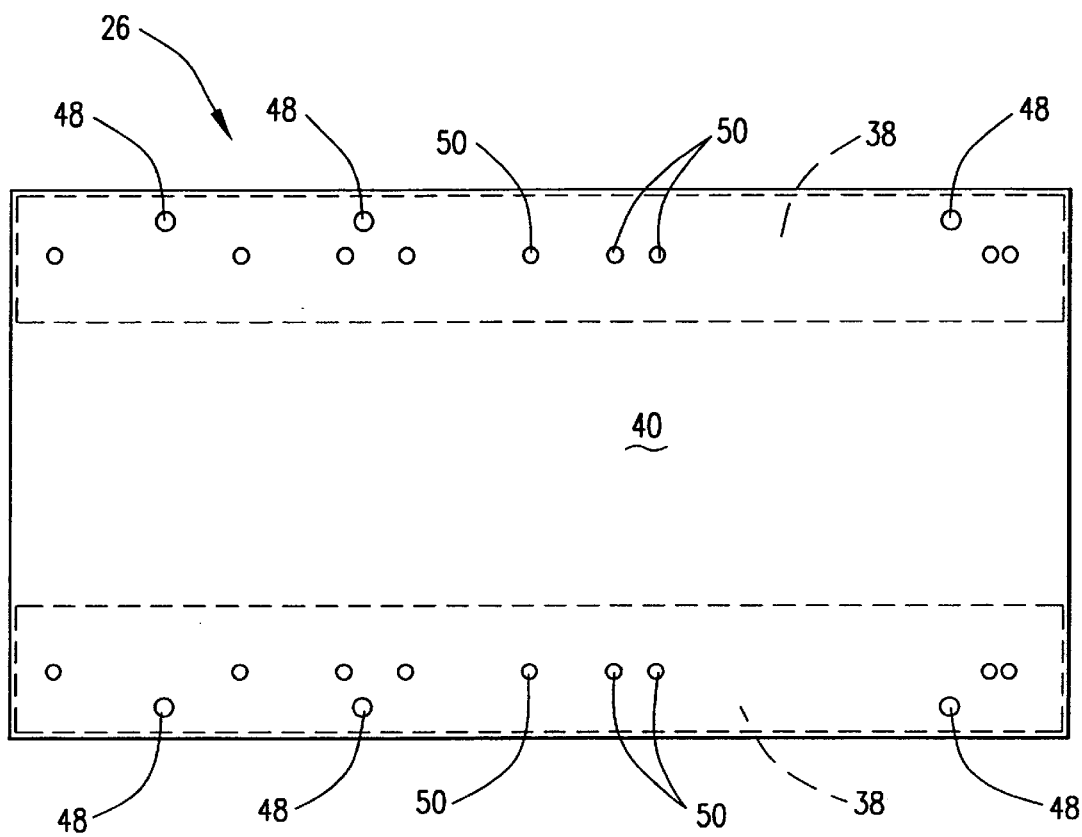
FIG. 6 is a top view of the motor table of the motor mount of FIG. 5 showing the apertures, adapter plate, and motor table base.

In addition to the adjustment mechanisms 34 on the motor platform 24, the motor table 26 provides an adjustment of motor 18 in another dimension relative to the pump 12. The thickness of the motor table bases 38 shown in FIG. 5 can be varied as required to achieve a desired height of the adaptor plate relative to the motor dimensions, and can be changed as necessary to adjust in the vertical or z direction. The adaptor plate 40 is provided with a plurality of predetermined sets of mounting apertures, as shown in FIG. 6, wherein the adapter plate 40 is shown. These aperture sets are established so that the motor 18 can be set relative to the x and y directions to accommodate a wide range of motor frames having a particular shaft height. FIG. 6 shows the motor table 26 as having a plurality of platform fastener apertures 48 and motor fastener apertures 50 that receive the platform fasteners 46 and motor fasteners 42 extending there through to connect the adaptor plate 40 to the motor platform as shown in FIG. 5.

The motor table 26 of the present invention is designed such that the apertures 48, 50 are configured to accept the required range of standard motor fastener 42 aperture sets. This eliminates the cost of motor 18 change-outs due to the expense and time involved with changing out or modifying a motor mount 20 every time a different motor size is required. This is especially true with existing horizontal pumping systems because the horsepower demands can vary greatly, necessitating frequent changes of pump 12 and motor 18. Since the most changes involve a change in the dimensions of the pump/motor combination, it is common for the shaft height and motor foot locations to change, and traditionally each motor change would require a change of the motor mount 20 to accommodate the new pump/motor combination. This problem has been addressed in the present invention by the addition of a variable height motor table base 38 and adapter plate 40 as shown in the motor mount 20 of FIG. 5.

In the past manufactures have handled changes in pump or motor by varying the motor platform height 24 and the fastener pattern. Each motor required a different motor mount and sometimes a different base. Each motor mount would require different drawings and part numbers to accommodate the different motor sizes. For example, for those pump-motor assemblies commonly encountered in a large segment of the oil industry, horizontal pump-motor assemblies used to inject fluid down-hole commonly required about ten motor mounts with a required range of motors and at least eight different base lengths. This resulted in more than eighty possible part numbers and drawings.

The motor table base 38 and adapter plate 40 reduce these parts and drawings to a relative few different adapter bases 38 and only a few adapter plates 40 with all anticipated patterns of the aperture 48, 50 provided in these few adapter plates 40.

Figure 7:
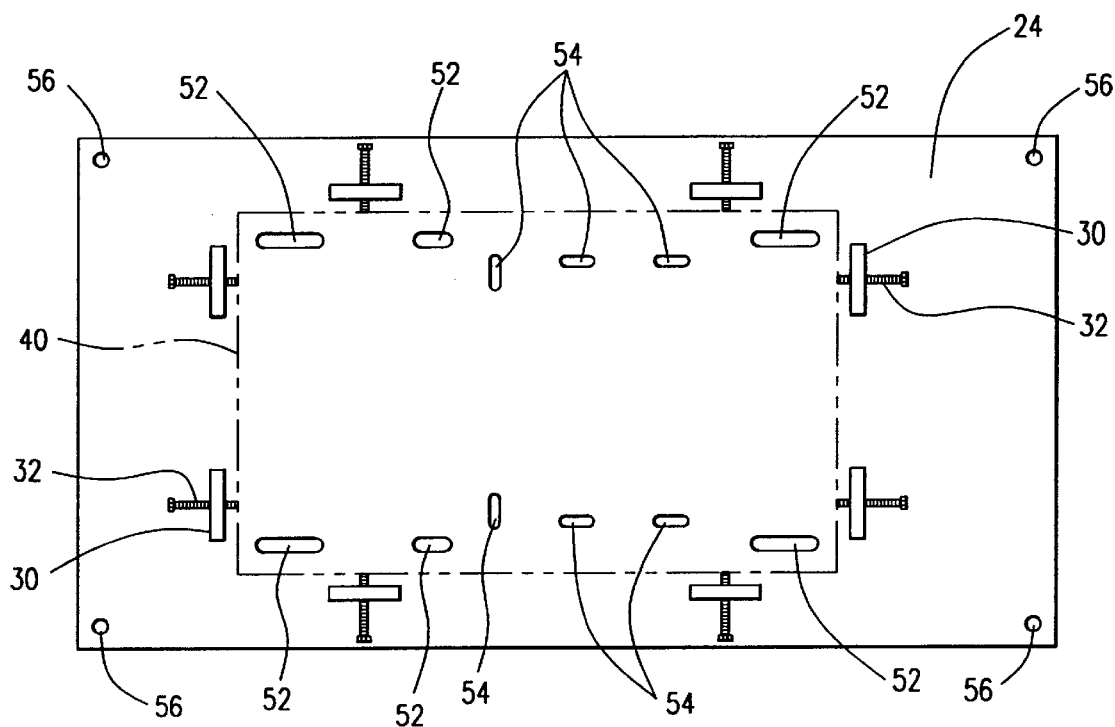
FIG. 7 is a top view of the motor platform of the motor mount of FIG. 5. showing the apertures and jacking blocks.
Figure 8:
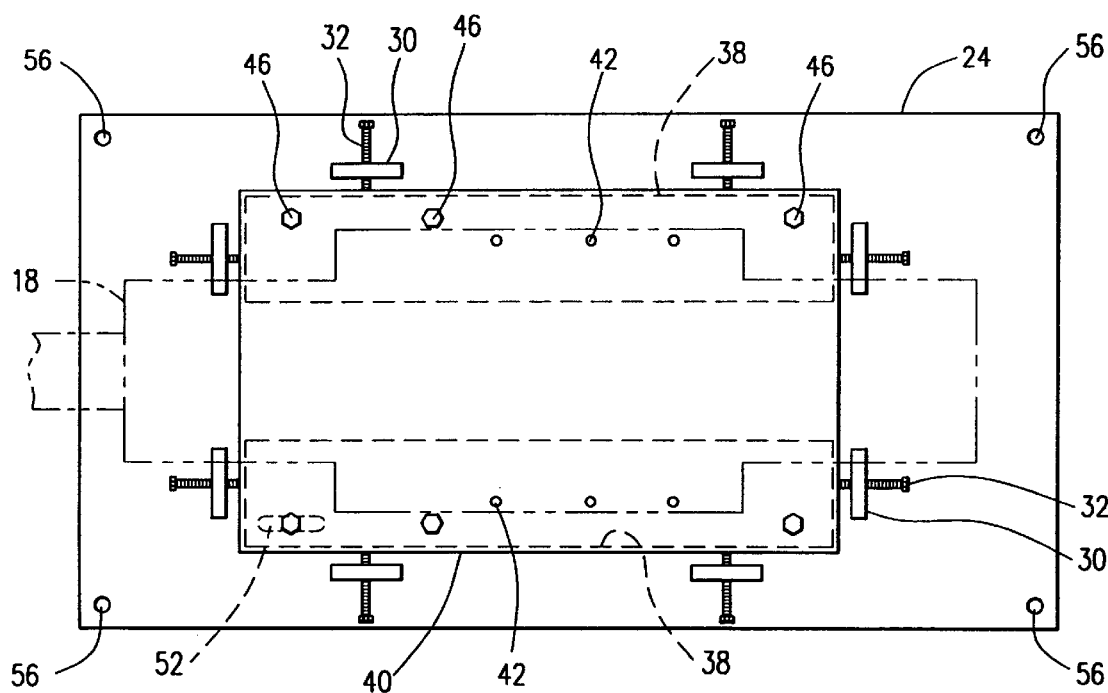
FIG. 8 is a top view of the motor table of FIG. 6 and motor platform of FIG. 7, along with a motor outline, as such would group together.

FIG. 7 shows the motor platform 24 having eight adjustment mechanisms 34, each adjustment mechanism 34 made up of one of the before described jacking blocks 30 and jack screws 32. These adjustment mechanisms 34 are attached to the motor platform 24 so that the motor table 26 is adjustable in two directions (x and y) for finely tuned adjustments. The elongated platform fastener apertures 52 and the elongated motor fastener apertures 54 allow the adjustment mechanisms 34 to be moved as discussed above. The motor platform 24 also has a circular aperture 56 in each corner of the motor platform 24 that receive the base fasteners 28. FIG. 8 shows the adaptor plate 40 as positioned on the motor platform 24 and nested between the eight adjustment mechanisms 34.

The adapter plate 40 of the present invention, with the variable height capability of the motor table base 38 and the plurality of predetermined sets of motor fastener apertures 50, determines the motor shaft height relative to the motor platform 24. The heights of the pump brackets 14 are also fixed. Thus, only the thickness of the motor table base plates 38 are varied to handle a wide range of motor sizes as required.

Figure 9:
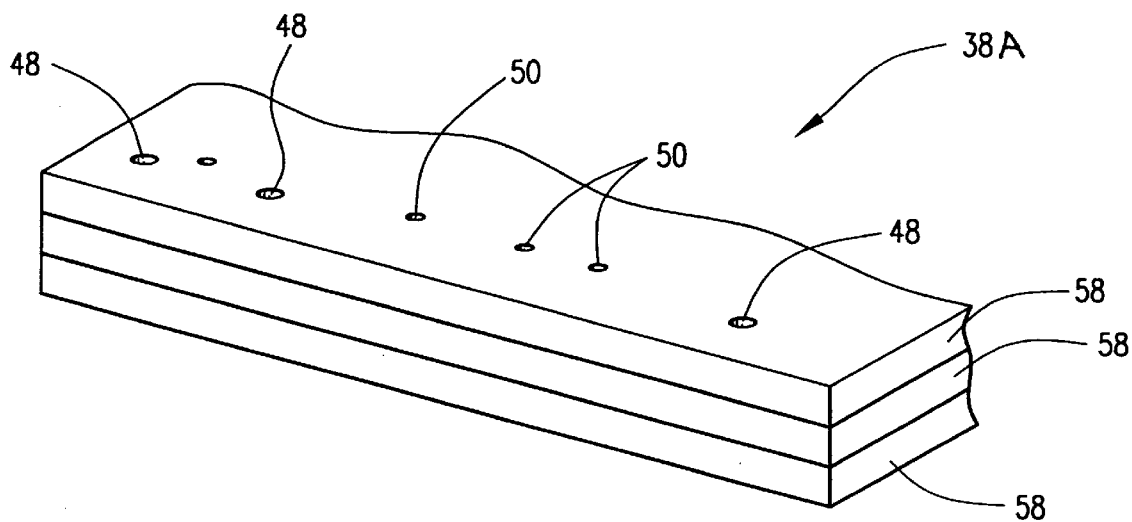
FIG. 9 is a perspective view of one type of motor table base of the motor mount of FIG. 6.

An alternative manner of changing the thickness of the base plates is shown in FIG. 9 where is shown the base plate 38A. The base plate 38A is made up of several plates 58 which are stacked and fastened together by welding, as shown, or with fasteners. The plates 58 are provided with axially aligned apertures 48, 50 and when stacked serve the same purpose as the above described base plate 38. The thickness of the base plate 38A can be varied at will by altering the number of plates 58 to accommodate all required motor-pump combinations as the resulting pump shaft height may require.

The present invention offers an economy of manufacture while affording maximum serviceability at the site of installation through the use of a standard adapter plate (such as 40) and a variable height adapter base (such as 38). The time consuming and expensive procedure for preparing up-front engineering design work and large inventories for a number of different parts is no longer necessary for the manufacturer or supplier to develop and maintain.

It will be clear that the present invention is well adapted to attain the ends and advantages mentioned as well as those inherent therein. While a presently preferred embodiment has been described for purposes of this disclosure, numerous changes may be made which will readily suggest themselves to one skilled in the art and which are encompassed in the spirit of the invention disclosed and as defined in the appended claims.

We claim:

1. A pump-motor assembly comprising:

a base;

a horizontal pump supported by the base;

a pump bracket supporting the pump and attaching the pump to the base;

a motor connected to the pump, the motor having attaching apertures; and a motor mount for supporting the motor in 3 dimensional adjustable alignment with the pump, the motor mount comprising:

a motor platform supported by the base;

a motor table adjustably supported by the motor platform and having a plurality of predetermined sets of mounting apertures, the attaching apertures of the motor alignable with a selected one of the predetermined sets of mounting apertures;

fasteners connecting the motor table to the motor platform; and fastener members interconnecting the motor and motor table via the selected set of mounting apertures.

2. The pump-motor assembly of claim 1 wherein the motor table has an adaptor plate and a motor table base.

3. The pump-motor assembly of claim 2 wherein the motor table base comprises multiple layers, the number of such layers determining the height of the adaptor plate above the motor platform.

4. The pump-motor assembly of claim 3 wherein the motor mount comprises a plurality of adjusting mechanisms supported by the motor platform to adjust the position of the motor table in the horizontal plane, each adjusting mechanism having a jacking block and aback screw, the jacking blocks spatially disposed to surround the motor table.

5. In a pump-motor assembly having a base and a horizontal pump in combination with an improvement comprising:

a motor connected to the pump, the motor having attaching apertures; and a motor mount supporting the motor and capable of positioning the motor in 3 dimensional alignment with the pump, the motor mount comprising:

a motor platform supported by the base;

a motor table adjustably supported by the motor platform, the motor table having a plurality of predetermined sets of mounting apertures, the motor attaching apertures alignable with a selected one of the predetermined sets of mounting apertures;

fasteners connecting the motor table to the motor platform, and fastener members interconnecting the motor and motor table via the selected set of mounting apertures.

6. The pump-motor assembly of claim 5 wherein the motor table has an adaptor plate and a motor table base.

7. The pump-motor assembly of claim 6 wherein the motor table base comprises multiple layers, the number of such layers determining the height of the adaptor plate above the motor platform.

8. The pump-motor assembly of claim 7 wherein the motor mount comprises a plurality of adjusting mechanisms supported by the motor platform to adjust the position of the motor table in the horizontal plane, each adjusting mechanism having a jacking block and a jack screw, the jacking blocks spatially disposed to surround the motor table.

* * * * *

UNITED STATES PATENT AND TRADEMARK OFFICE
CERTIFICATE OF CORRECTION

PATENT NO.    : 6,450,782 B1
DATED         : September 17, 2002
INVENTOR(S)   : Stephen M. Sakamoto It is certified that error appears in the above-identified patent and that said Letters Patent is hereby corrected as shown below:

Column 2,
Line 60, replace "there through" with -- therethrough --

Column 5,
Line 21, replace "aback screw" with -- a jack screw --

Signed and Sealed this

Fourth Day of March, 2003

JAMES E. ROGAN
*Director of the United States Patent and Trademark Office*